United States Patent [19]

Spies

[11] 4,120,093
[45] Oct. 17, 1978

[54] PLANAR MEASURING INSTRUMENT

[75] Inventor: Alfons Spies, Munich, Fed. Rep. of Germany

[73] Assignee: Dr. Johannes Heidenhain GmbH, Traunreut, Fed. Rep. of Germany

[21] Appl. No.: 734,536

[22] Filed: Oct. 21, 1976

[30] Foreign Application Priority Data

Oct. 23, 1975 [DE] Fed. Rep. of Germany ....... 2547478
Jun. 5, 1976 [DE] Fed. Rep. of Germany ....... 2625489

[51] Int. Cl.² .............................................. G01B 7/34
[52] U.S. Cl. ................................. 33/174 P; 33/174 L
[58] Field of Search ................. 33/174 P, 174 L, 144, 33/287, 338, 1 Q, 174 Q, 174 R

[56] References Cited

U.S. PATENT DOCUMENTS

| 3,208,151 | 9/1965 | Rawstron | 33/174 P |
| 3,596,362 | 8/1971 | Reason | 33/174 P |
| 3,675,233 | 7/1972 | Bencsics | 33/287 |
| 3,750,299 | 8/1973 | Plasser et al. | 33/287 |

Primary Examiner—Richard E. Aegerter
Assistant Examiner—Willis Little
Attorney, Agent, or Firm—Hume, Clement, Brinks, Willian & Olds, Ltd.

[57] ABSTRACT

A planar measuring instrument is disclosed for determining the deviations from the straightness or planeness of parts, the instrument including a laser beam and a measuring sensor which is displaceable transversely to the measuring direction, both of which are enclosed in an elongated, preferably evacuated, hollow body. In one disclosed embodiment, the laser beam impinges on a photo detector associated with the planar sensing bolt whose output signals cooperate with an electromagnet associated with the planar sensing bolt to compensate for guidance errors. In another series of embodiments, the laser beam is separated into partial beams. One of these partial beams impinges on reference detectors located at the end of the measuring path with the output of said reference detectors being used to drive a servo system which adjusts the direction of the laser beam and reference line determined by it. The other partial beam is used for cooperation with the measuring sensor system.

29 Claims, 18 Drawing Figures

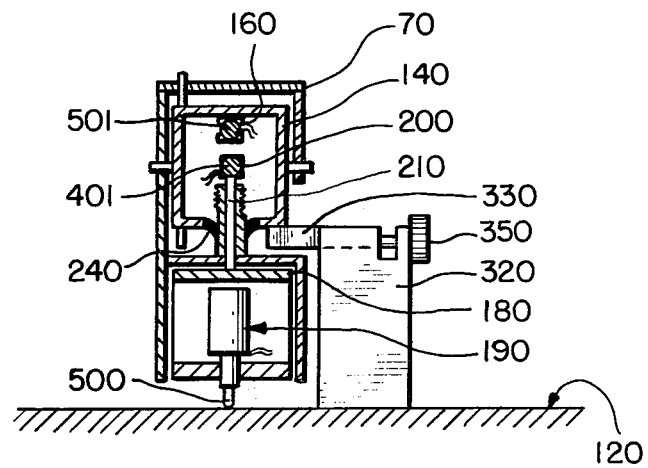
FIG. 5
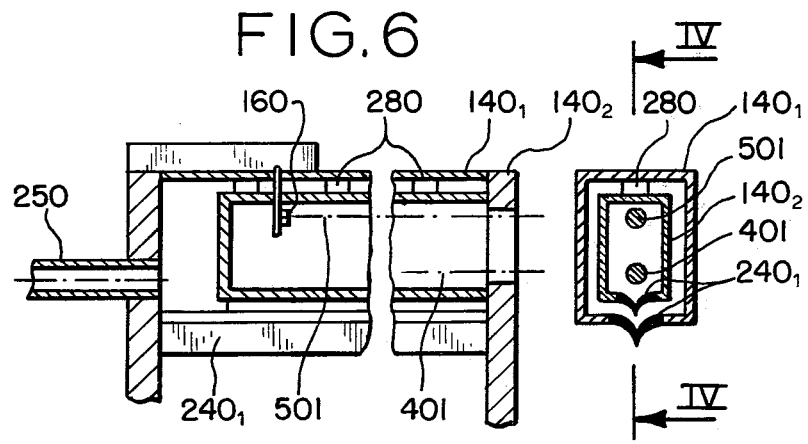
FIG. 6
FIG. 6a

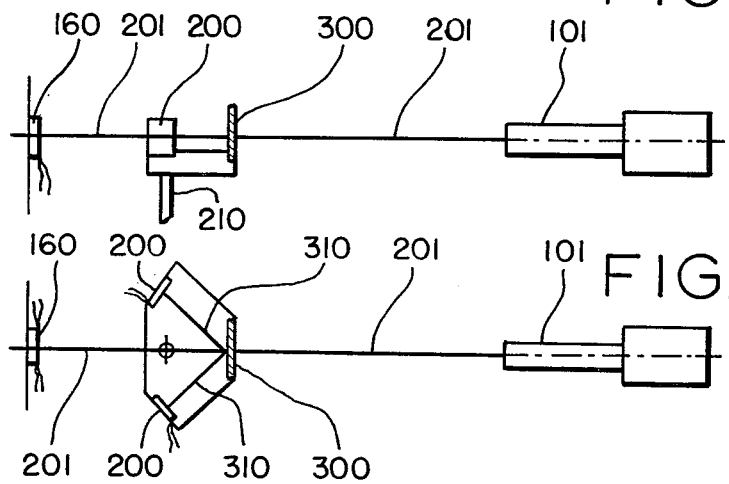
FIG. 8
FIG. 8a
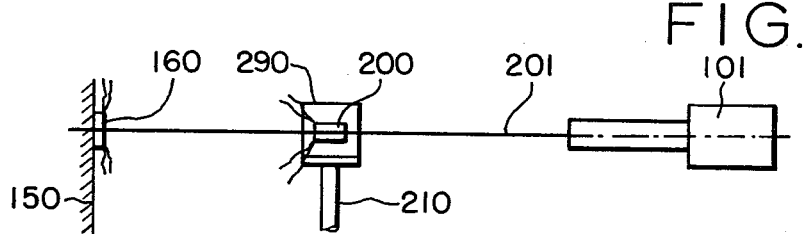
FIG. 7
FIG. 7a

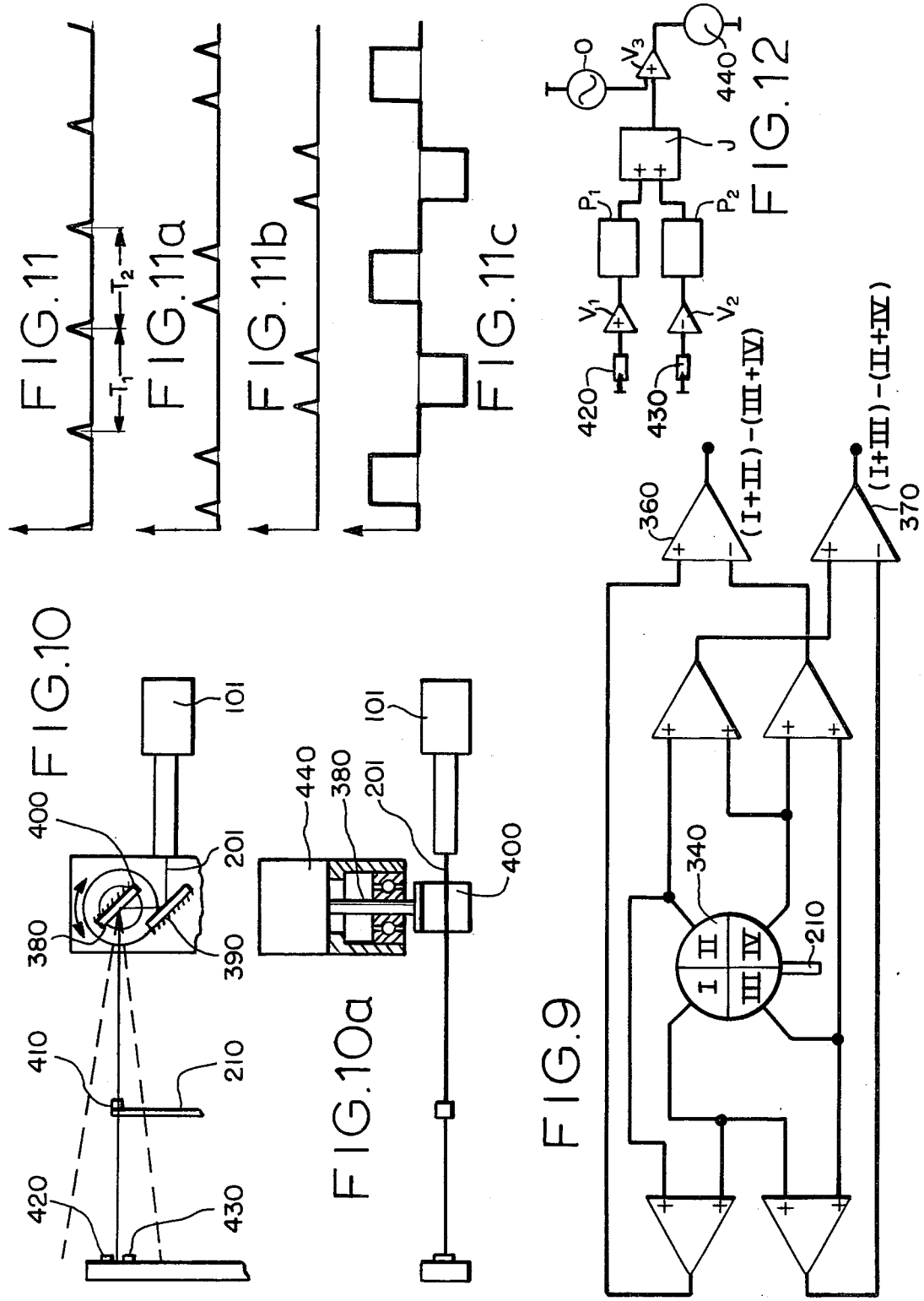

PLANAR MEASURING INSTRUMENT

The invention relates to a measuring device to determine the deviations from the straightness or planeness of parts with the aid of a measuring sensor which is displaceable at a guidance transversely to the measuring direction.

Planar measuring apparatus already are known, for example, from West German Offenlegungsschrift No. 2,208,004. In the apparatus disclosed in that Offenlegungsschrift, a sensing bolt is moved in the direction of a laser beam over the surface of the part to be tested. Thereby the sensor bolt carries out stroke movements extending transversely to the direction of the light beam and these movements are transmitted to a diaphragm in the laser beam. As a result of the stroke movements of the sensor bolt the height of the shadow strip in the laser beam is modified and corresponding changes of the remaining laser beam result which are converted into electrical readings in a photoelectric detector. With planar readings of this kind disturbing fluctuations of the laser beam can occur which will lead to measurement errors.

Moreover, it is known to use a directed laser beam as reference straight line for measuring planeness and straightness. A laser beam is particularly highly appropriate for this purpose, due to its low cross-section, its small angle of aperture, the almost gauss-like distribution of the brightness over the cross-section, and the high density of energy.

Laser beams already have been used successfully in the building industry to produce level elements and directional measurements. The requirements as to precision are low in this respect. A much higher precision (for example ± 1 micron per 1 meter of measuring length) is required in measuring machine guides. For such high requirements a laser beam located in the open air is not readily appropriate, because the luminous beam is deflected from its straight path by varying pressures or temperatures as well as by turbulences in the air. Other difficulties reside in the directional stability of the laser beam itself (caused by thermal conditions at the laser tube) and in the directional stability of the mounting of the laser.

The straightness of the guide means of a part is defined by placing a straight line through two points connected to the guide means and by measuring the deviations of the guides from this ideal straight reference line. With the use of a laser the straight reference line is defined first by a point and by the directional tangent the laser beam has at this point. If the directional tangent changes during a reading, errors increasing with increasing measuring length will result. At a change of the angle of 1 arc second for example, an error of 5 microns results at a distance of 1 meter from the mounting point. Even a very rigid fastening of the laser at the part to be measured or at a guide means would not offer any notable improvement, because, for example, with the movement of a machine carriage the machine guide itself is bent and changes its direction through the angle of deflection of the laser beam.

Accordingly, it is an object of the present invention to provide a measuring device of the kind generally described above which is free of the disadvantages of the known devices and which has a high measuring precision even at varying environmental influences and which is also characterized by a simple, compact design permitting a many-sided applicability.

Additional features and advantages of the present invention are described in, and will appear from, the description of the preferred embodiments which follow and from the drawings to which reference is now made.

FIG. 1 schematically represents a measuring device in accordance with the present invention.

FIG. 2 is a sectional view taken along line II—II of FIG. 1.

FIG. 3 schematically illustrates a longitudinal section through another embodiment of a measuring device in accordance with the present invention.

FIG. 5 is a sectional view taken along line III—III of FIG. 3.

FIG. 6 schematically illustrates a longitudinal section through another embodiment of the present invention.

FIG. 6a is a cross-sectional view through the embodiment illustrated in FIG. 6.

FIG. 7 schematically illustrates the path of the light rays of another embodiment of the present invention.

FIG. 7a is a lateral view of the features illustrated in FIG. 7.

FIG. 8 schematically illustrates the path of the light rays of still another embodiment of the present invention.

FIG. 8a is a top view of the features illustrated in FIG. 8.

FIG. 9 schematically illustrates the circuit diagram of the photo-elements in one embodiment of the present invention.

FIG. 10 illustrates the path of rays of an embodiment of the present invention with dynamic evaluation.

FIGS. 11, 11a, and 11b illustrate output signals of the photo-elements of the embodiment illustrated in FIG. 10.

FIG. 11c illustrates standardized output signals relating to FIGS. 11a and 11b.

FIG. 12 illustrates an electric circuit diagram for the evaluation of the signals represented in FIGS. 11a and 11b.

Figure 1:
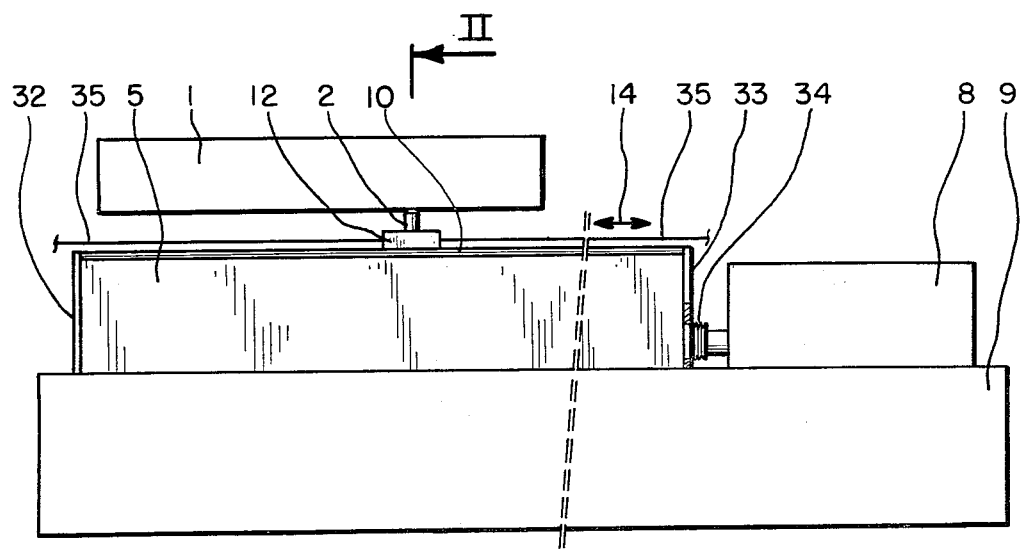

In FIG. 1, there is shown a test piece 1 which may have a planar or cylindrical shape. Test piece 1 is scanned by a sensing bolt 2 which is a component of a reading receiver; in FIG. 1, it is a digital electrical longitudinal measurement sensor with incremental path processing. Digital measuring sensors are known, for example, from West German Gebrauchsmuster No. 7,506,036. With incremental measuring sensors, the readings are displayed in numerical form at an electronic up-down counter which is not part of the structure shown in the drawings. A counter which is particularly appropriate for the longitudinal measuring sensor shown in the illustrated embodiment is disclosed in West German Gebrauchsmuster No. 7,413,290. Several advantages are achieved by using a digital measuring sensor in conjunction with the measuring device of this invention. One advantage is the large measuring range at high precision. In addition, such sensors permit a convenient reading of the measured value as well as the capability for further processing or storage of measuring values.

Figure 2:
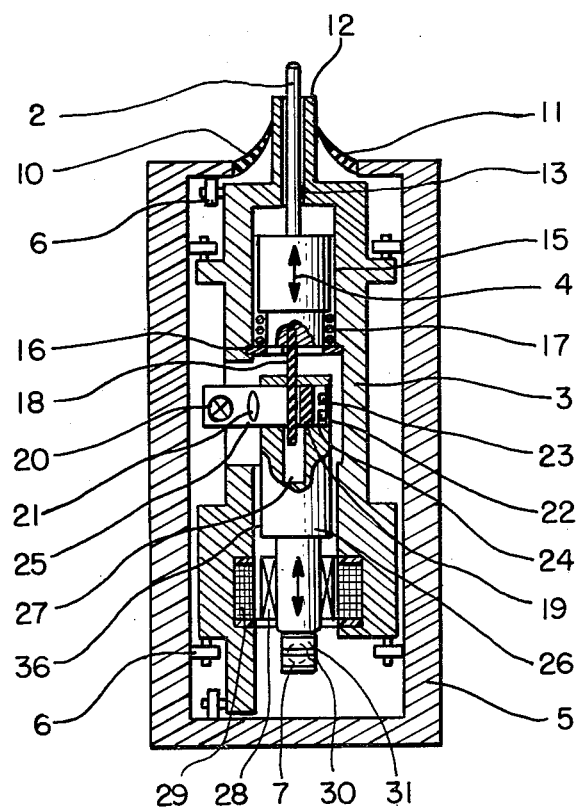

The measuring sensor is displaceably arranged in a measuring sensor supporting body 3 transverse to the measuring direction (indicated in FIG. 2 by the arrow 4). The guidance for supporting body 3 is formed by a hollow body 5, at whose inner surfaces supporting body 3 is seated a guide member such as via roller bearings 6. Hollow body 5 is an extruded aluminum profile. A laser beam 7, emanating from laser 8, is enlisted for controlling the guide means 5 and it defines the straight reference line. Both hollow body 5 and a laser 8 are mounted on a frame 9. In accordance with the present invention, laser beam 7 is embraced by the hollow body 5 along its entire measuring path. The inner area of hollow body 5 is evacuated. (The pump necessary for the generation of the required vacuum is not shown in the drawing.) As a result of the screening of laser beam 7 and the evacuation of the area immediately surrounding said beam, disturbing fluctuations of the beam are eliminated.

Hollow body 5 is provided with a slot which is sealed by flexible roof-shaped sealing lips 10, 11 and with a sword-shaped component 12 extending through said lips and protruding from the supporting body 3. Sensor bolt 2 extends out of hollow body 5 free from positive forces through an opening 13 in the sword-shaped component 12. Hollow body 5 is sealed at its ends by lips 32, 33. The laser 8 is connected to hollow body 5 via a tubular membrane 34. In the embodiment the measuring sensor-support body 3 is propelled in a longitudinal direction along the measuring path via a rope 35 which appropriately engages sword-shaped component 12 outside the hollow body 5, its direction of movement being identified by the arrow 14.

Sensor bolt 2 is positioned movably in the axial direction a support structure such as in the supporting body 3 in a precision guide 15. Precision guide 15 also has a protection against torsion for the sensor bolt 2. A grid scale 18 is fastened to the sensor bolt 2, its grid graduation forming a rectilinear continuation of the axis of sensor bolt 2. A spring 17 seated at a ring 16 causes a defined pressing force of the sensor bolt 2 toward test piece 1. Grid scale 18 is scanned by a sensor plate 19 provided with a grid graduation. Sensor plate 19 is mounted at a holding means 25, fixed to a reference structure such as bolt 26 along with a lamp 20, a condenser 21, and a support 22 for photoelectronic building components 23, 24. The way in which bolt 26 functions as a reference structure will be described in detail below; however, it should be noted here that this embodiment of the invention includes means for automatically aligning the bolt 26 with the laser beam 7. Since the bolt 26 is maintained in alignment with the reference line of laser beam 7, the bolt 26 itself serves as a reference structure. Bolt 26 is positioned displaceably in a precision guide means 36 in the supporting body 3 and is secured against torsion in a manner not shown. The bolt 26 has a slot 27 into which grid graduation 18 protrudes without contact with the bolt.

An electric coil 28 is placed at the lower end of bolt 26, with a permanent magnet 29 assocated with coil 28 being mounted to supporting body 3. Coil 28 and magnet 29 coact as a linear motor. Laser beam 7 is directed toward a detector mounted at bolt 26, at the lower end of coil 28, the detector containing two photoelectronic building components 30, 31 switched at a difference in relation to each other, their amplified electrical output signal influencing the coil 28. Under the compensation system of the present invention, bolt 26 and thus sensor plate 19 are moved in the measuring direction in case of a diviation of the supporting body 3 from the reference straight line defined by laser beam 7, said movement being over such a distance until both photoelectric building components 30, 31 again are hit by the same amount of laser light, so that there will be established a zero compensation.

As a result of the use of a digital electric measuring sensor, which, as is known, has a wide measuring range, relatively large guiding errors are admissible for the supporting body 3. This considerably simplifies the fabrication of the measuring device of the present invention, more so because the screening hollow body 5 also is used as a guide support for measuring sensor supporting body 3.

The electrical building components (amplifier, etc.) connected to the photoelectronic building elements 23, 24 and/or 30, 31 are located outside hollow body 5. The conduits interconnecting the electrical components to the photoelectric elements enter hollow body 5 through recesses in sword-shaped component 12.

A number of advantages are achieved in the measuring instrument shown in the embodiment of FIG. 1 which are due to the coaction of a digital measuring sensor, a housing unit 5 embodying screening and guidance for the measuring sensor-supporting body 3, as well as to a compensation system acting directly on the digital measuring sensor and/or on the housing unit of the sensor. Among these advantages are a high precision over the large measuring range, guarantee against environmental interference, simple construction, a small, compact design, simple adjustment since the use of a digital measuring scanner and/or the measuring scanner guide and the part to be tested, multilateral applicability, and convenience reading of the measured value.

In a departure from the embodiment shown in FIG. 1, it is possible to provide two partial beams as the straight line of reference, which are produced by splitting up the laser beam with the aid of a Koster prism, said partial beams always being placed symmetrically to the plane of symmetry of the Koster prism.

Figure 3:
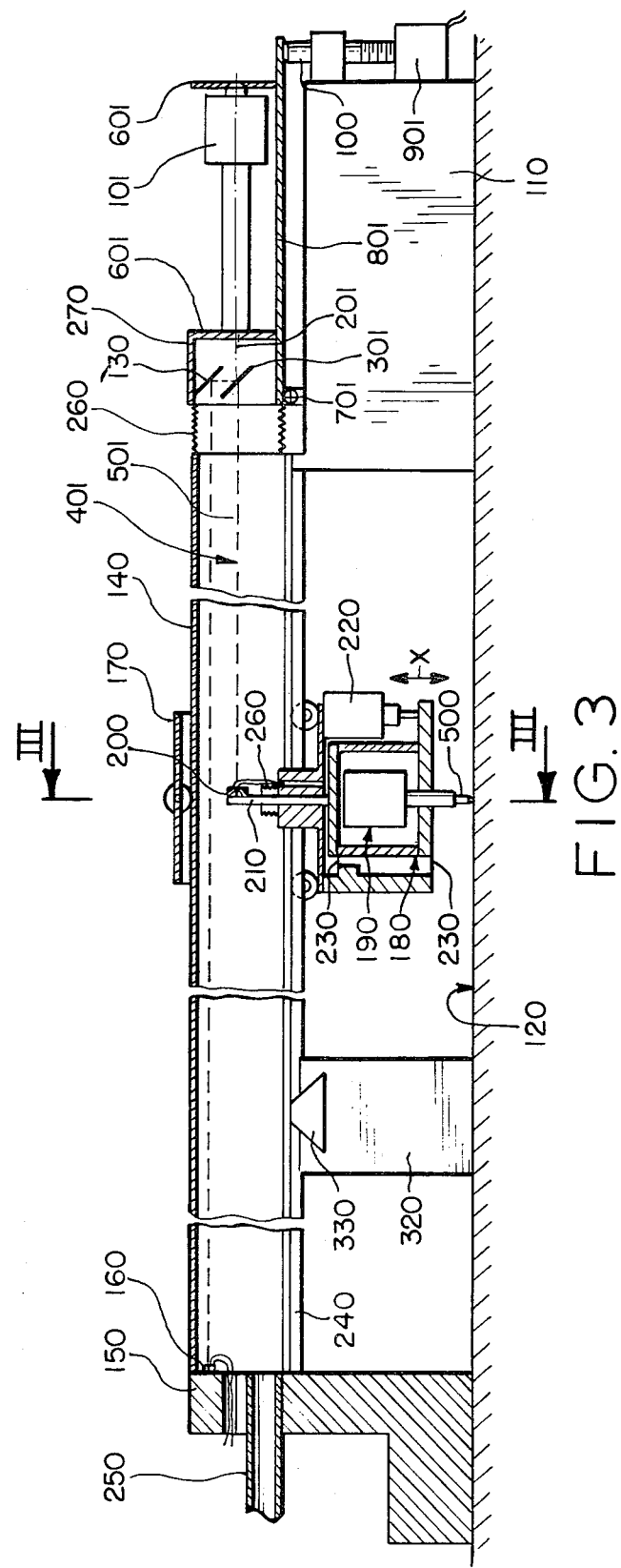
Figure 4:
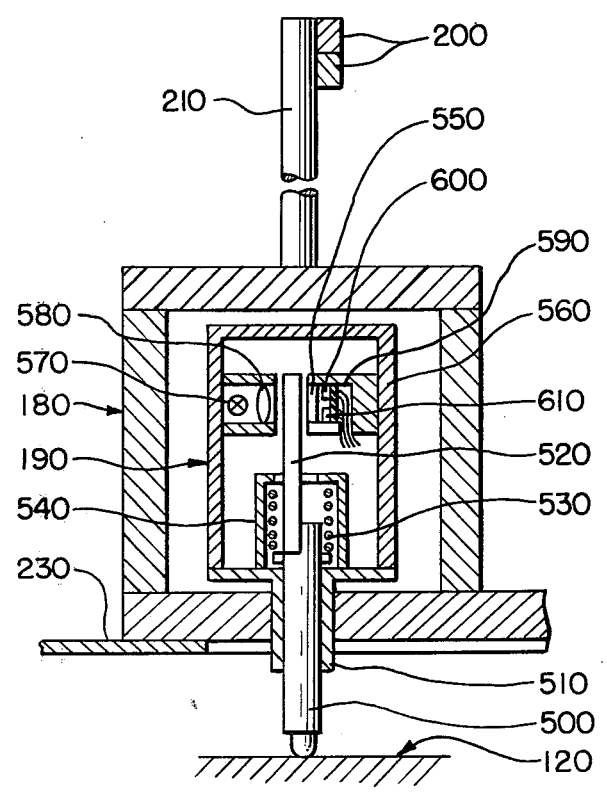
FIG. 4 is an enlarged detail view of a portion of the measuring instrument illustrated in FIG. 3.

In the embodiment illustrated in FIGS. 3 through 5, laser beam 201 emitted by laser 101 impinges upon a partly permeable mirror 301 and is divided into two partial beams 401 and 501. Laser 101 is maintained between two membranes 601 which are fastened to base plate 801 pivotable about shaft 701. The base plate 801 can be rotated about shaft 701 via a spindle 100 propelled by motor 901. The shaft 701, the spindle 100, and the motor 901 are fastened to a solid leg 110, which is placed on the object 120 to be measured.

The partial beam 501 split off by the mirror 301 is deflected by a mirror 130 by 90°, so that it extends parallel with the partial beam 401. Mirrors 301 and 130 are both mounted to base plate 801. One end of hollow body 140 is mounted on leg 110 while its other end is mounted on leg 150 which also rests on the object to be measured 120.

Two photo elements 160 connected in difference are applied to leg 150 and illuminated by the partial beam 501. Photoelements 160, the motor 901, and spindle 100 form a servo system together with an amplifier (not shown), said system adjusting the base plate 801 and thereby the direction of partial beam 501 as long and until both photo-elements 160 are illuminated with the same brightness and until their electrical output signal amounts to zero in the difference.

A support structure such as a carriage 170 is movably arranged on hollow body 140 along the path of the laser beam. Carriage 170 has a slot on one side covered by movable sealing lips 240. A coupling 180, bearing an electronic measuring sensor 190, is fastened to carriage 170 via spring members 230. Differentially connected photoelements 200 are applied to coupling 180 via a rod 210, partial beam 401 impinging on said photo-elements. Photo-elements 200 register deviations of carriage 170 to which the measuring sensor 190 is applied with the aid of the straight reference line defined by laser beam 401. Photo-elements 200 and a motor 220, together with an amplifier (not shown) form a servo system causing a compensation of guiding errors. This is accomplished in such a manner that a servo motor 220 moves coupling 180 in the direction of arrow X until photo-elements 200 are illuminated with identical brightness and their electrical output signal is zero in the difference.

In FIG. 4, which illustrates an enlarged sectional view through measuring sensor 190, reference numeral 500 identifies a scanning bolt which senses the object 120 to be measured. Scanning or sensing bolt 500 is a component of a recorder of the measured value which preferably is a digital electric longitude measuring sensor with incremental path recording.

Sensor bolt 500 is movably positioned in the axial direction in a precision guide 510 which is secured against torsion for the sensor bolt 500. A grid scale 520 which forms the rectilinear continuation of the axis of sensor bolt 500 is fastened to the sensor bolt 500. A spring 530 which seats on a sleeve 540 causes a direct pressing of sensor bolt 500 against the object 120 to be measured. Grid scale 520 is scanned by a grid sensor plate 550. Grid sensor plate 550 is stationarily mounted to housing wall 560 by holding means, as is lamp 570, condenser 580 and support 590 for photoelectric components 600 and 610.

Hollow body 140 (FIG. 3 and 5) can be evacuated via a pipe connection. All moving parts are connected vacuum tight to hollow body 140 with bellows 260. Both mirrors 301 and 130 are placed in a vacuum tight housing 270 connected to hollow body 140 via bellows 260.

In case of long measuring paths it is appropriate to provide legs 320 for support at several locations along hollow body 140. In FIG. 3, hollow body 140 is mounted on a carriage 330 movable in leg 320. Carriage 330 can be adjusted with a screw 350 (FIG. 5) perpendicularly to the measuring direction and perpendicularly to the direction of movement of carriage 170. In this embodiment, photo detector 340 at the rod 210 is a four quadrant diode, as is shown in the appropriate circuit diagram in FIG. 9. Hollow body 140 is moved laterally by actuating screw 350 until the four quadrant diode 340 (FIG. 9) is illuminated symmetrically, and the laser beam is thus precisely in the prolongation of the measuring axis of the sensor 190. This particular arrangement eliminates the measuring errors caused by the twisting of hollow body 140 about ist longitudinal axis.

In the measuring device illustrated in FIG. 3 to 5 a number of important advantages are produced by the coaction of follow-up control of the laser beam by photo-elements 160 and 901, the electronic measuring sensor 190, the compensation system of photo-elements 200, and the servo motor 140. Among the advantages are: high precision even over a great length (because the position of laser 301 relative to the part 120 to be measured is determined by the points of fixation formed by photo-elements 160 and swivel joint 701 and determined at the beginning and end of the measuring path, so that angle changes at the laser tube 101 or at the base 110 have no influence on the measurement); high freedom from interference, as both laser beams 401 and 501 are placed in pacified air or advantageously in vacuum; and simple adjustment because major deviations between the part 120 to be tested and guide means 140 are admissible for the measuring sensor 190 as a result of the compensation system 200, 220.

In the embodiment illustrated in FIGS. 6 and 6a, hollow body $140_1$ contains a second hollow body $140_2$ which likewise is provided with a slot sealed by sealing lips $240_1$. Hollow body $140_2$ is fastened to the hollow body $140_1$ through the interposition of highly heat insulating spacer bushings 280. The two partial laser beams 401 and 501 are in hollow body $140_2$. The area between the hollow bodies $140_1$ and $140_2$ can be evacuated via the pipe $250_1$ which creates a vacuum in hollow body $140_2$ because sealing lips $240_1$ are effective only against external superpressure. The design of the measuring carriage and of the servo systems of the embodiment illustrated in FIGS. 6 and 6a corresponds with the design shown in FIG. 3 to 5.

The addition of an additional hollow body $140_2$ causes further pacification of the enclosed air. This results in improved density results due to the evacuation of the measuring channel.

FIGS. 7 and 7a show an addtional embodiment for dividing laser beam 201 into two partial beams. In this embodiment, beam 201 emitted from the laser 101 impinges a partly permeable mirror 290. The reflected partial beam of laser beam 201 impinges on two photoelements 200 connected in difference. The photoelements 200 and the divider mirror 290 are connected with the coupling 180 shown in FIG. 3 via a phase plate and rod 210. The partial beam allowed to pass through divider mirror 290 impinges the photo-elements 160 placed at the end of the measuring path at the leg 150. This arrangement avoids disadvantages which could occur possibly in the embodiment illustrated in FIGS. 3 through 5 due to the spatial distance of the partial beams 401 and 501.

FIG. 8 and 8a show an additional appropriate embodiment for splitting the laser beam. In this embodiment, laser beam 201 impinges a diffraction screen 300 steamed on a thin glass plate, its grid strips being placed parallel to the measuring direction of measuring sensor 190 (See FIG. 3). Diffraction screen 300 divides laser beam 201 into two partial beams 310 which impinge photo-elements 300 which are switched or connected in difference. Photo-elements 200 and diffraction screen 300 are connected via rod 210 to coupling 180 of carriage 170. As already shown in FIG. 3 to 5, the electronic measuring sensor 190 is followed up via photoelements 200. The undiffracted principal beam 201 of the laser beam inpinges the photo-elements at the end of the measuring path and is used to follow up laser 101.

The embodiment illustrated in FIG. 8 and 8a is designed so that the principal beam 201 impinges the photo-elements 160 at the end of the measuring path almost undisturbed. Turns and shiftings of diffraction screen 300 almost have no influence on the path of principal beam 201. It also is possible to use a self-supporting screen, for example from thin gold foil, in lieu of a diffraction screen steamed on glass. The direction of the principal beam 201 is then no longer influenced by the screen at all.

The embodiments according to FIG. 3 to 8 use static methods for the capturing and following up laser beam 201 and/or of the measuring sensor 190.

FIG. 10 and 10a illustrate an embodiment with dynamic evaluation. In this embodiment, light ray 201 originating from stationary laser 101 impinges a stationary mirror 390 and then mirror 400 which oscillates about an axis 380 and which is propelled by motor 440. The beam deflected by the mirror 400 scans a photo-element 410 mounted on carriage 170 via rod 210 (See FIG. 3) and also photo-elements 420 and 430 at the end of the measuring path.

FIG. 11 shows the output signals of photo-element 410. The photo-element 410 is moved by the adjustment motor 220 (see FIG. 3) until times $T_1$ and $T_2$ are equal, that is a zero compensation has been established. FIG. 11a shows the output signals of photo-element 420 while FIG. 11b shows the output signals of photo-element 430.

FIG. 12 shows a circuit diagram for the further evaluation of the output signals of photo-elements 420 and 430. Both output signals are amplified in amplifiers $V_1$ and $V_2$ and supplied separately to pulse former component $P_1$ and/or $P_2$. Thereafter the sum total of the converted signals is integrated in an integrator J. The sum of the signals adhering to the integrator J is represented in FIG. 11c. In the symmetrical position of the laser beam to the center of photo-elements 420, 430, the integral over the voltages equals zero. In case of deviations from the center, an error signal is delivered to an amplifier $V_3$ which feeds adjustment motor 440. An AC signal generated by an oscillator 0 adheres simultaneously to the amplifier $V_3$ and it stimulates the motor 440 to perform oscillating movements. In case of deviation of the laser beam, the plane of symmetry of the oscillation performed by the mirror 400 is adjusted by the motor 440 until the error signal equals zero.

FIG. 9 shows the design and the circuit necessary therefor of a four quadrant diode 340. The difference of the sum of the quadrants I and II and of the sum of quadrants III and IV appears at the output of the amplifier 360. Thus the output signal of the amplifier 360 furnishes information about an upward or downward shifting of the laser beam, that is in the measuring direction of sensor 190 (FIG. 3). The difference between the sum of the quadrant I and III and the sum of quadrant II and IV appears at the output of the amplifier 370. The output signal of the amplifier 370 thus furnishes information about a shifting of the laser beam to the left or right. The diode 340 is connected via rod 210 to the measuring sensor 190 of the carriage 170 (FIG. 3).

Unless the line of separation of the quadrant I/II and III/IV is precisely vertical on the axis of digital measuring 190, the laser beam generates, in case of a deflection of the measuring sensor 190 perpendicular to the measuring direction, a voltage difference signal which cannot be distinguished from the signal created during an actual shifting of the measuring sensor 190 in the measuring direction. The error just mentioned may be compensated by adding the differential signal of the diode 340, which is created in case of a shifting against the laser beam in measuring direction at the output of the amplifier 360, to part of the differential signal of the diode 340, which is created under a lateral shifting against the laser beam at the output of the amplifier 370, by means of an electronic sum total circuit. The oblique position of the line of separation at the diode 340 to the axis of measurement must be known, the factor of proportionality is selected commensurate with the oblique position.

The embodiments described herein are intended to be exemplary of the types of measuring instruments which fall within the scope of the invention. However, one skilled in the art would certainly be expected to be able to make modifications and variations of these preferred embodiments without departing from the spirit and scope of the invention as defined in the following claims.

I claim:
1. A measuring instrument for measuring the extent to which the surface of an object deviates from a reference line comprising:
   means for generating a substantially collimated light beam which defines the reference line;
   means for measuring the position with respect to the reference line of the surface of the object along a measuring direction;
   detection means associated with the measuring means adapted to detect the light beam and to register the deviation along the measuring direction of the measuring means from the light beam; and
   position adjusting means responsive to the detection means adapted to adjust the position of the measuring means automatically to substantially eliminate the deviation.

2. The instrument defined in claim 1 further comprising a hollow body positioned around the light beam to protect the beam from environmental interferences.

3. The instrument defined in claim 2 wherein a portion of the interior of the hollow body is evacuated.

4. The instrument defind in claim 1 further comprising a support structure adapted to support the measuring means and a hollow body which is disposed around the light beam and is adapted to guide the longitudinal translation of the support structure over the surface in a direction substantially parallel to the light beam.

5. The instrument defined in claim 4, wherein the support structure is disposed within the hollow body and comprises a guide member which cooperates with the inner surface of the hollow body to guide the longitudinal translation of the support structure over the surface, and the hollow body is provided with a slotted opening adapted to permit a portion of the measuring means to protrude outside of the hollow body.

6. The instrument defined in claim 4, wherein the position adjusting means comprises means for positioning the measuring means with respect to the support structure.

7. The instrument defined in claim 6, wherein the position adjusting means comprises a linear motor which includes an electrical coil and a magnet.

8. The instrument defined in claim 5, further comprising means for longitudinally translating the support structure, which means are disposed outside the hollow body.

9. The instrument defined in claim 5, wherein the slotted opening is provided with means for sealing the slotted opening against the flow of fluid from the volume outside of the hollow body into the volume inside the hollow body.

10. The instrument defined in claim 2, wherein the hollow body comprises an aluminum extrusion.

11. The instrument defined in claim 1, wherein the measuring means comprises a photoelectric incremental position sensor including a sensor bolt adapted to contact the surface.

12. The instrument defined in claim 1, wherein the detection means comprises two photosensors adapted to generate a difference signal corresponding to the difference between the intensity of the light beam striking the two photosensors.

13. The instrument defined in claim 12, wherein the position adjusting means continually adjusts the position of the measuring means so as to reduce the magnitude of the difference signal.

14. The instrument defined in claim 1, wherein the light beam generating means is fixedly mounted with respect to the surface.

15. A measuring instrument for measuring the extent to which the surface of an object deviates from a reference line comprising:
 a laser adapted to generate a laser beam;
 a hollow body disposed around the laser beam to protect the beam from environmental interferences;
 a support structure disposed within the hollow body adapted to move substantially parallel to the laser beam;
 a reference structure positioned on the support structure;
 two photosensors positioned on the reference structure adapted to generate a difference signal corresponding to the difference in intensity of laser illumination of the two photosensors;
 position adjusting means responsive to the difference signal and adapted to move the reference structure with respect to the support structure so as to reduce the magnitude of the difference signal;
 a sensor bolt adapted to contact the surface; and
 a position measuring means adapted to measure the position of the sensor bolt with respect to the reference structure.

16. A measuring instrument for measuring the extent to which the surface of an object deviates from a reference line comprising:
 a sensor which measures the separation along a measuring direction between the surface and the sensor and is adapted to translate along a measuring path angled with respect to the measuring direction;
 a laser adjacent the first end of the measuring path adapted to generate a laser beam;
 fixedly mounted photodetector means which is adjacent a second end of the measuring path, thereby defining a reference position, and is adapted to generate a control signal corresponding to the deviation of the laser beam from the reference position;
 a first positioning means for maintaining the separation along the measuring direction between the laser beam and the sensor substantially constant; and
 a second positioning means for responding to the control signal to adjust the orientation of the laser so as to cause the laser beam to strike the reference position.

17. The instrument defined in claim 16, further comprising reflecting means positioned in the laser beam and adapted to split the laser beam into two substantially parallel partial beams whereby a first partial beam is formed which cooperates with the first positioning means, and a second partial beam is formed which cooperates with the second positioning means.

18. The instrument defined in claim 17, further comprising sensor mounted photodetector means adapted to detect the first partial beam.

19. The instrument defined in claim 18, wherein both the sensor mounted photodetector means and the fixedly mounted photodetector means individually comprise two photodetector elements.

20. The instrument defined in claim 18, wherein the fixedly mounted photodetector means comprises two photodetector elements and the second positioning means is adapted to adjust the orientation of the laser so as to equalize the laser illumination of the two photodetector elements.

21. The instrument defined in claim 20, further defined in that the laser is positioned between two diaphragms affixed to a base plate provided with a swivel, and that the second positioning means adjusts the orientation of the laser by pivoting the base plate around the swivel.

22. The instrument defined in claim 16, further comprising defraction means positioned in the laser beam and adapted to split the laser beam into a central partial beam which passes through the defraction means onto the fixedly mounted photodetector means and two defracted partial beams which cooperate with the first positioning means.

23. The instrument defined in claim 22, wherein the defraction means comprises a self supporting foil.

24. The instrument defined in claim 16, wherein the fixedly mounted photodetector means comprises two photodetector elements and wherein the instrument further comprises:
 a laser beam deflection means adapted to oscillate the orientation of the laser beam;
 a third photodetector element associated with the sensor; and
 means for measuring the time intervals between laser illumination of the three photodetector elements and for generating control signals for the first and second positioning means.

25. The instrument defined in claim 16 further comprising:
 a hollow body adapted to protect the laser beam from environmental interferences which is provided with an opening extending along the path of measurement through which a portion of the sensor extends.

26. The instrument defined in claim 16 further comprising:
 an outer hollow body;
 an inner hollow body positioned inside the first hollow body and around the laser beam;
 sealable openings in the inner and outer hollow bodies adapted to permit a portion of the sensor to extend from the interior of the inner hollow body to the exterior of the outer hollow body; and
 means for evacuating the volume between the inner and the outer hollow bodies.

27. The instrument as defined in claim 16 further comprising a digital distance measuring means adapted to measure the position of the sensor along the measuring path.

28. A measuring instrument for measuring the extent to which the surface of an object deviates from a reference line comprising:
 a laser adapted to generate a laser beam which extends in a longitudinal direction substantially parallel to the surface;
 an elongated hollow body disposed around the laser beam;
 a support structure adapted to move substantially in the longitudinal direction guided by the hollow body;

a reference structure carried by the support structure;

a position sensor adapted to measure the separation between the surface and the reference structure along a measuring direction substantially transverse to the longitudinal direction;

a reflecting means adapted to split the laser beam into first and second substantially parallel partial beams;

a first photodetector means mounted on the reference structure adapted to generate a first signal corresponding to the deviation of the reference structure from the first partial beam along the measuring direction;

a first positioning means which moves the reference structure with respect to the support structure to reduce the magnitude of the first signal;

a second photodetector means mounted on the hollow body adapted to generate a second signal corresponding to the deviation of the laser beam from a reference position along the measuring position defined by the location of the second photodetector means; and a second positioning means which moves the laser to reduce the magnitude of the second signal.

29. A measuring instrument for measuring the extent to which the surface of an object deviates from a reference line comprising:

a sensor which measures the separation along a measuring direction between the surface and the sensor and is adapted to translate along a measuring path angled with respect to the measuring direction;

a laser adapted to generate a laser beam;

first means for adjusting the position of the sensor in a lateral direction transverse to the measuring path responsive to a first correction signal;

second means for adjusting the position of the sensor along the direction of measurement responsive to a second correction signal;

four quadrant photodetector means fixedly connected to the sensor; and control signal generating means adapted to generate the first control signal which causes the first adjusting means to center the quadrant photodetector in the laser beam along the lateral direction and a second control signal which causes the second adjustment means to center the quadrant photodetector in the laser beam along the direction of measurement.

30. The instrument defined in claim 27 further comprising a support structure adapted to support the measuring means and a hollow body which is disposed around the light beam and is adapted to guide the longitudinal translation of the support structure over the surface in a direction substantially parallel to the light beam.

* * * * *

UNITED STATES PATENT AND TRADEMARK OFFICE
CERTIFICATE OF CORRECTION

PATENT NO. : 4,120,093
DATED : October 17, 1978
INVENTOR(S) : Alfons Spies

It is certified that error appears in the above-identified patent and that said Letters Patent are hereby corrected as shown below:

Column 3, line 2 after "seated" insert --via--;
after "such as" delete "via".

Column 3, line 25, after "measuring" delete "path" and insert --direction--.

Column 3, line 30, after "tion" insert --in--;
after "such as" delete "in".

Column 3, line 55, "assocated" should read --associated--.

Column 3, line 65 "divation" should read --deviation--.

Column 3, line 67 "photoelectric" should read --photoelectronic--.

Column 5, line 53 "ist" should read --its--.

Column 5, line 58 "and 901" should be cancelled.

Column 5, line 62 "301" should read --201--.

Column 6, line 31 "phase" should read --base--.

Column 8, line 30, claim 4, "defind" should read --defined--.

UNITED STATES PATENT AND TRADEMARK OFFICE
CERTIFICATE OF CORRECTION

PATENT NO. : 4,120,093
DATED : October 17, 1978
INVENTOR(S) : Alfons Spies

It is certified that error appears in the above–identified patent and that said Letters Patent are hereby corrected as shown below:

Column 10, line 16, claim 22, "defraction" should be --diffraction--.

Column 10, line 18, claim 22, "defraction" should be --diffraction--.

Column 10, line 19, claim 22, "de-" should be --dif- --.

Column 10, line 23, claim 23, "defraction" should be --diffraction--.

Signed and Sealed this

Twenty-ninth Day of May 1979

[SEAL]

Attest:

RUTH C. MASON
Attesting Officer

DONALD W. BANNER
Commissioner of Patents and Trademarks